United States Patent
Buchner et al.

(10) Patent No.: US 7,372,004 B2
(45) Date of Patent: May 13, 2008

(54) METHOD AND DEVICE FOR RECORDING THE REGISTRATION OF THE CONNECTION OF A HOUSEHOLD APPLIANCE TO A BUS LINE CONFIGURATION

(75) Inventors: Theo Buchner, Neustadt (DE); Johannes Gaugler, Regensburg (DE)

(73) Assignee: BSH Bosch und Siemens Hausgeraete GmbH, Munich (DE)

(*) Notice: Subject to any disclaimer, the term of this patent is extended or adjusted under 35 U.S.C. 154(b) by 169 days.

(21) Appl. No.: 11/235,620

(22) Filed: Sep. 26, 2005

(65) Prior Publication Data
US 2006/0049171 A1    Mar. 9, 2006

Related U.S. Application Data

(63) Continuation of application No. PCT/EP2004/002860, filed on Mar. 18, 2004.

(30) Foreign Application Priority Data
Mar. 25, 2003   (DE)   ................................ 103 13 360

(51) Int. Cl.
*H05B 1/02* (2006.01)
(52) U.S. Cl. ................ 219/494; 219/506; 219/483
(58) Field of Classification Search .............. 219/494, 219/501, 506, 505, 492, 483–486, 412–414
See application file for complete search history.

(56) References Cited

U.S. PATENT DOCUMENTS

| 5,352,957 | A | 10/1994 | Werner |
| 5,481,750 | A | 1/1996 | Parise et al. |
| 5,815,086 | A * | 9/1998 | Ivie et al. .............. 340/825.52 |
| 6,853,291 | B1 | 2/2005 | Aisa |
| 6,980,079 | B1 * | 12/2005 | Shintani et al. .............. 340/3.1 |
| 2002/0073183 | A1 | 6/2002 | Yoon et al. |
| 2003/0046377 | A1 * | 3/2003 | Daum et al. ................ 709/223 |
| 2004/0158333 | A1 | 8/2004 | Ha et al. |

FOREIGN PATENT DOCUMENTS

| DE | 100 56 492 A1 | 5/2002 |
| DE | 102 08 221 A1 | 9/2003 |
| EP | 0 629 934 A1 | 12/1994 |
| FR | 2 670 590 | 6/1992 |
| FR | 2 670 590 A1 | 6/1992 |
| WO | WO 99/43068 | 8/1999 |
| WO | WO 02/097555 A2 | 12/2002 |

* cited by examiner

*Primary Examiner*—Mark Paschall
(74) *Attorney, Agent, or Firm*—Laurence A. Greenberg; Werner H. Stemer; Ralph E. Locher

(57) ABSTRACT

The aim of the invention is to record the registration of the connection of a household appliance to a bus line configuration to which a plurality of household appliances is to be, or is, connected, for the transmission of data. To this end, the household appliance in question is provided with an intrinsic interface that can be connected to the cited bus line configuration, and by which data can be transmitted into and/or from the household appliance. The household appliance also contains at least one display device for displaying operating states and/or operating data of the household appliance, the display device also being used to visualize the course and/or state of the registration of the connection of the household appliance to the bus line configuration.

5 Claims, 2 Drawing Sheets

METHOD AND DEVICE FOR RECORDING THE REGISTRATION OF THE CONNECTION OF A HOUSEHOLD APPLIANCE TO A BUS LINE CONFIGURATION

CROSS-REFERENCE TO RELATED APPLICATION

This is a continuing application, under 35 U.S.C. § 120, of copending international application No. PCT/EP2004/002860, filed Mar. 18, 2004, which designated the United States; this application also claims the priority, under 35 U.S.C. § 119, of German patent application No. 103 13 360.7, filed Mar. 25, 2003; the prior applications are herewith incorporated by reference in their entirety.

BACKGROUND OF THE INVENTION

1. Field of the Invention

The invention relates to a method and a device for detecting the registration of a connection of a domestic appliance to a bus line configuration, on which a plurality of domestic appliances for transmitting data is to be connected or respectively is connected. The relevant domestic appliance can be connected by an appliance interface to the above-mentioned bus line configuration, over which data can be transmitted into the and/or from the relevant domestic appliance. The above-mentioned domestic appliance has at least one display device, by which operating modes and/or operating data of the relevant domestic appliance can be displayed.

It is already known from published, non-prosecuted German patent application DE 100 56 492 A1 to connect a plurality of domestic appliances to a bus line configuration, via which data can be transmitted to and from the relevant domestic appliances. The bus line configuration can at the same time be a communications network utilizing the voltage or respectively current supply lines of the relevant domestic appliances. Also, at least some of the relevant domestic appliances can be equipped with a display device, by which operating modes and/or operating data can be displayed in the relevant domestic appliances. In this context it is also known that the respective domestic appliance with its appliance number logs on with a service provider, who then transmits different information, such as updated programs, advertising, etc. if required for display on the domestic appliance-intrinsic display device by the appliance numbers available to him. In the relevant context however there are no further details given on procedures, which run when such a domestic appliance is connected to the above-mentioned communications network.

The measure of providing a domestic appliance with an intrinsic appliance interface, which can be connected with a bus line configuration, over which data can be transmitted into the and/or from the relevant domestic appliance, has already been put forward elsewhere. The connection of the relevant appliance interface to the above-mentioned bus line configuration tales place via a modem, which is connected with a voltage supply line, which for one delivers the supply voltage for the relevant domestic appliance and also is used as the above-mentioned bus line configuration. In the relevant context it is assumed known that a domestic appliance is to be clearly identified by identification data. However, there is nothing in this context given on measures or respectively procedures, which rub in context with connecting such a domestic appliance to a bus line configuration.

SUMMARY OF THE INVENTION

It is accordingly an object of the invention to provide a method and a device for recording the registration of the connection of a household appliance to a bus line configuration that overcome the above-mentioned disadvantages of the prior art methods and of this general type.

With the foregoing and other objects in view there is provided, in accordance with the invention, a method for detecting a registration of a connection of a domestic appliance on a bus line configuration. A plurality of domestic appliances for transmitting data are to be connected or respectively are connected to the bus line configuration. The method includes connecting the domestic appliance to the bus line configuration through an appliance interface of the domestic appliance, and through the bus line configuration data is transmitted into the and/or from the domestic appliance. Operating modes and/or operating data of the domestic appliance are displayed on at least one display device of the domestic appliance. On the display device of the domestic appliance a course and/or state of the registration of the connection of the domestic appliance to the bus line configuration is visualized. Course and/or status messages of a bus coupler connected with the domestic appliance are used for visualizing the course and/or state of the registration.

If the domestic appliance is connected up to the bus line configuration, to which the plurality of domestic appliances for transmitting data is to be connected or respectively is connected, then it does not suffice to have only the appliance number of the relevant domestic appliance, in order to gain access thereto. Rather, further details are needed on the access or respectively connection path to the relevant domestic appliance. Such data, which represent addresses, can be allocated when the domestic appliance is connected to the bus line configuration for the relevant domestic appliance, for example according to the known domestic appliance protocols EHS1.3a or respectively KNX-A mode, and be logged in address memories. In the case where a plurality of domestic appliances for transmitting data is to be connected or respectively is connected, the address memories can be made available to the user or operator of the relevant domestic appliance information on the registration, therefore on its acquisition.

This task is solved by a method of the above-mentioned type according to the present invention by the display device of the above-mentioned domestic appliance for visualizing the course and/or state of registration of the connection of the relevant domestic appliance also being utilized on the bus line configuration.

This results in the advantage whereby particularly easily the status and/or course of the registration taking place on this connection can be displayed in the domestic appliance, connected to a bus line configuration, to which a plurality of domestic appliances is to be connected or is connected, in that the display device available anyway in the relevant domestic appliance is employed for visualizing. Such a display device is usually used in the relevant domestic appliance for displaying the respective program cycle; for example, in the event where the relevant domestic appliance is a washing machine and is in spin mode, it displays "spin" and if required the respective spinning speed.

Because the display devices in domestic appliances can be configured very differently, correspondingly different displays can also be supplied for visualising the above-mentioned registration. Seven-segment display devices or graphic liquid crystal display devices are considered as display devices, for example. Thus for example graphic status bar or text messages are displayed in the respective display device. By use of a seven-segment display device there can also be, for example, a countdown display, with which e.g. the registration progress can be visualized to display the value 0, based on a preset starting number.

Registration at the start-up of the above-mentioned domestic appliance connected to the bus line configuration is undertaken appropriately. This offers the advantage that the putting into service required for use of the relevant domestic appliance can be employed for its registration and thus for visualizing of the respective state and/or course of the relevant registration.

It is also of advantage to use course and/or status messages delivered by a bus coupler connecting the relevant domestic appliance with the above-mentioned bus line configuration for visualizing the above-mentioned registration course and/or state. No additional devices need to be provided for course and/or status messages for this purpose.

During visualizing of the above-mentioned registration course and/or state by the relevant display device a domestic address management is first visualized appropriately by the above-mentioned display device, via which the relevant domestic appliance is bonded in a virtual network containing the bus line configuration by an unambiguous domestic appliance address being assigned to it in the relevant virtual network. At this point chaining or respectively link address management is visualized by the relevant display device, via which in the above-mentioned virtual network an unambiguous bus coupler address is assigned to the bus coupler connected with the relevant domestic appliance, by which the relevant bus coupler is clearly identifiable among those bus couplers connected with the individual present domestic appliances. Finally the execution of a notification procedure is visualized by the relevant display device, via which the appliance class of the relevant domestic appliance in the above-mentioned virtual network is known, by which the domestic appliances present in the relevant virtual network indicate whether they want to or must communicate with the above-mentioned domestic appliance.

Through these measures it is easily and surely achieved that the above-mentioned domestic appliance can be clearly identified in the above-mentioned virtual network, and communication between the domestic appliances connected to the relevant virtual network is easily possible. In addition to this, the user or operator of the relevant domestic appliance can easily ascertain by way of the above-mentioned visualizing whether the registration or respectively sign-on procedure is still running, whether the above-mentioned domestic appliance is logged on the bus line configuration, whether there is interference in communication over the bus line configuration, or whether a domestic appliance or a connection to a monitoring and/or control unit constituting a potential remote terminal is still active, etc.

The visualization step containing the domestic address management is carried out appropriately only at the initial start-up of the above-mentioned domestic appliance and the visualization steps containing the link address management as well as the notification procedure are performed with every start-up of the relevant domestic appliance.

The above-mentioned domestic address management at the same time advantageously needs to be performed only with the initial connection of the relevant domestic appliance with the above-mentioned bus line configuration. The chaining or respectively link address management and the above-mentioned notification procedure are to be performed with each fresh start-up of the relevant domestic appliance, in order to take into consideration the status current at this point in time in the above-mentioned virtual network. At this point, however, it should be noted that a fresh start-up of the above-mentioned domestic appliance is not only to be understood as being switched on again, if the relevant domestic appliance physically is still connected with its assigned bus coupler. In this case performing the above-mentioned chaining or respectively link address management and the above-mentioned notification procedure could be omitted, if only the supply voltage for the relevant domestic appliance is switched on so that is restarted.

Repetition of the above-mentioned chaining or respectively link address management and the above-mentioned notification procedure would then be required only in the event where the relevant domestic appliance were to be separated from its assigned bus coupler and then, for example following repairs, reconnected to the relevant bus coupler and where the supply voltage for the relevant domestic appliance were to be switched on for it to restart.

The above-mentioned bus line configuration can appropriately be operated either as a wireline communications network containing communications lines, as its communications lines in particular are used by voltage supply lines of the individual domestic appliances fed by a mains voltage source, or it can be operated as a radio network, in which the individual domestic appliances communicate by the above-mentioned send and receive devices forming bus couplers. In both cases there is the advantage of a relatively easy-to-build communications network.

For carrying out the method according to the present invention for registering the connection of a domestic appliance to a bus line configuration, to which a plurality of domestic appliances is to be connected or respectively is connected, there is preferably a device employed, in which the relevant domestic appliance has an intrinsic appliance interface, which can be connected with the above-mentioned bus line configuration, via which data can be transmitted into the and/or from the relevant domestic appliance, and in which the above-mentioned domestic appliance has at least one display device, by which operating modes and/or operating data of the relevant domestic appliance can be displayed. The device is characterized according to the present invention in that the display device of the above-mentioned domestic appliance can be controlled by way of its housing-intrinsic appliance interface of which, and if required, by a bus coupler connected with the above-mentioned bus line configuration during registration of the connection of the relevant domestic appliance to the bus line configuration by visualizing the above-mentioned registration course and/or state.

This gives rise to the advantage where, without additional expense on devices or respectively appliances, the above-mentioned visualizing can be undertaken. The display device present anyway in the relevant domestic appliance is simply utilized for relevant visualizing.

Registration of the connection of the above-mentioned domestic appliance to the bus line configuration and thus visualizing of the relevant registration course and/or state through switching on the supply voltage for the above-mentioned domestic appliance can be triggered appropriately. The advantage of this is that no separate switching devices need to be provided for the relevant registration and visualizing. With respect to the relevant registration and visualizing it should be noted here that these procedures, as already explained above, are not to be performed at every start-up of the relevant domestic appliance and thus not ay every switching on the supply voltage for the relevant domestic appliance. Rather, the above-mentioned domestic address management can be undertaken only with initial connecting of the relevant domestic appliance with the above-mentioned bus line configuration, and the chaining or respectively link address management and the above-mentioned notification procedure can be undertaken for every connection of the relevant domestic appliance with the above-mentioned bus line configuration.

The above-mentioned bus line configuration can preferably be connected via at least one transmission device and a communications network having an external control and/or monitoring device connected to the latter if required. The advantage here is that the respective domestic appliance, which is connected to the above-mentioned bus line configuration and whereof the registration has taken place, can be connected relatively simply with an external control and/or monitoring device, by which control and/or monitoring tasks can be performed in the relevant domestic appliance.

Other features which are considered as characteristic for the invention are set forth in the appended claims.

Although the invention is illustrated and described herein as embodied in a method and a device for recording the registration of the connection of a household appliance to a bus line configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
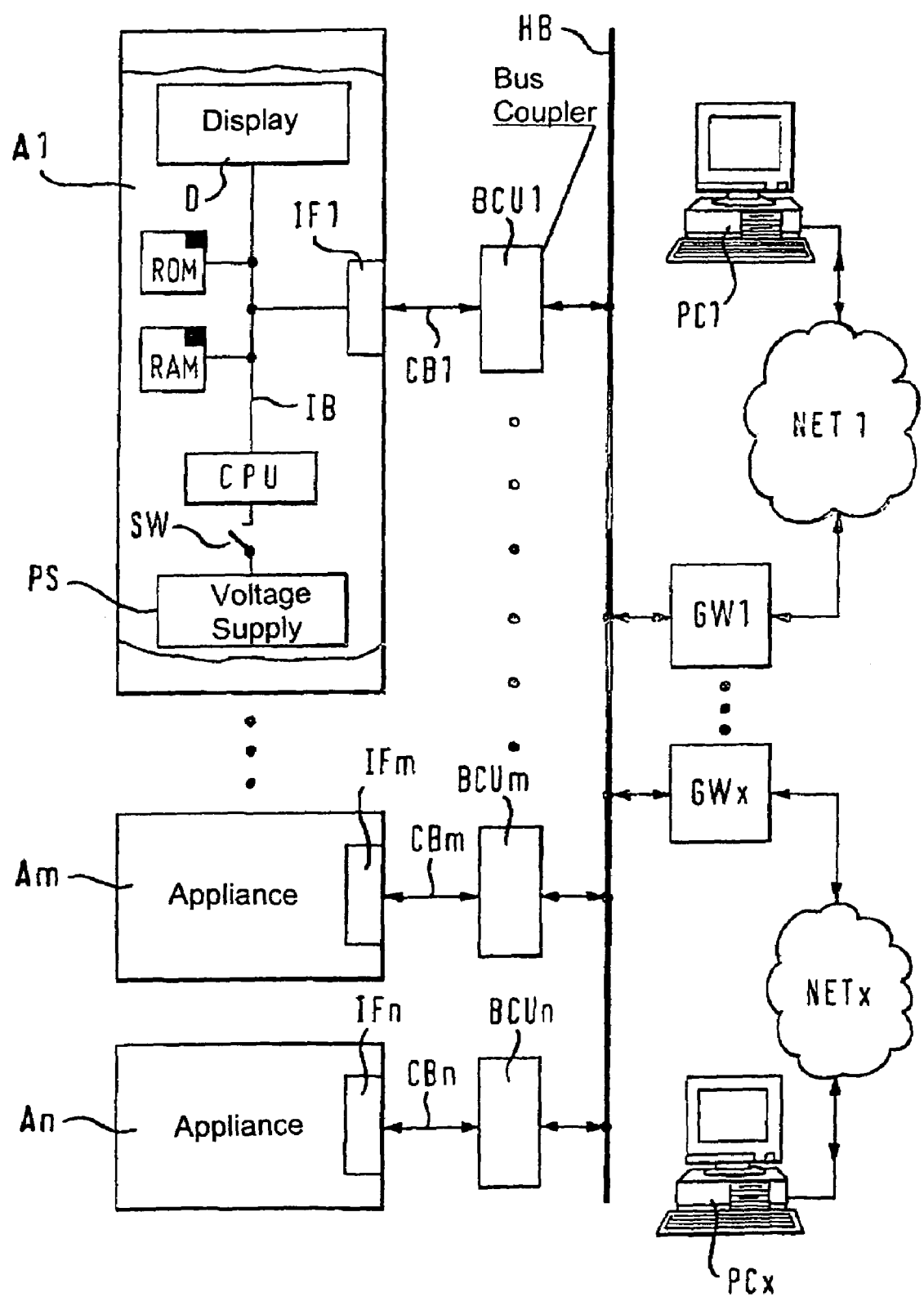
FIG. 1 is a schematic illustration of a bus line configuration, to which a plurality of domestic appliances is connected and which is connected via transmission devices with communications networks.

Referring now to the figures of the drawing in detail and first, particularly, to FIG. 1 thereof, there is shown schematically a plurality of domestic appliances A1 . . . Am, An, which are connected via bus coupler units or in short bus couplers BCU1 . . . BCUm, BCUn constituting communications units on a bus line configuration HB, which forms a first communications network. The communications network can be connected via transmission devices GW1 to GWx and further communications networks NET1 to NETx with external control and/or monitoring devices PC1 to PCx connected with the former.

The domestic appliances A1 . . . Am, An shown in FIG. 1 are for example identical or different domestic appliances belonging to a household or to several households, such as for example a washing machine, an electric stove, a dishwasher, a microwave appliance, a refrigerator, a range hood, an air-conditioning unit, a coffee machine, a vacuum cleaner, a hotplate or a freezer. The relevant domestic appliances A1 . . . Am, An are not shown here individually; rather, only those elements needed for an understanding of the present invention are shown, and to be more precise only with respect to the domestic appliance A1.

Examples of the above-mentioned elements of the domestic appliance A1 are inter alia a central unit CPU, which is connected to an internal bus IB, on which a ROM read-only memory and a RAM read-write memory as well as a display device D are also connected. The ROM read-only memory can be used to store work programs for operating the domestic appliance A1, which can be executed by the central unit CPU. During the execution of such work programs the RAM read-write memory serves as working memory for the illustrated computer system.

The CPU central unit is connected via a switch SW shown in the illustration to a voltage supply device PS, which here is an intrinsic or respectively separate voltage supply device of the domestic appliance A1. The voltage supply device PS is still available, for example when the supply or respectively mains voltage serving as operation of the relevant domestic appliance A1 drops out, to provide state or respectively status signals determined by the illustrated computer system for possible remote enquiry.

Connected to the internal bus IB of the domestic appliance A1 in the present case is yet another interface device IF1, which serves as communications connections to and from the relevant domestic appliance A1. The relevant interface device IF1 can be for example a serial interface device or a parallel interface device, as is usually used for data transmission. The above-mentioned remote enquiry can be made by way of the interface device IF1, for example.

With respect to the remaining domestic appliances Am and An illustrated in FIG. 1 it should be noted that these can be constructed in terms of circuitry in an identical manner to the previously mentioned domestic appliance A1. Both the illustrated domestic appliances Am and An are in each case equipped with their own interface device IFm or respectively IFn corresponding to the above-mentioned interface device IF1. The interface devices IFm, IFn can likewise be parallel or serial interface devices.

By way of their interface devices IF1 . . . 1Fm, IFn the domestic appliances A1 . . . Am, An are connected via terminal lines CB1 . . . CBm, CBn illustrated in FIG. 1 as bi-directionally operated connecting lines to assigned bus couplers BCU1 . . . BCUm, BCUn.

Via the bus couplers BCU1, BCUm, BCUn the domestic appliances A1 . . . Am, An are connected to the first communications network, which is depicted in FIG. 1 by a wireline communications network containing its own bus line configuration HB, which can have a plurality of individual lines. The above-mentioned bus couplers BCU1 . . . BCUm, BCUn serve here inter alia to convert domestic appliance-specific protocols or respectively data formats (so-called proprietary protocols) into bus-unit or respectively standardized protocols or respectively data formats, and vice versa serve to convert the bus-unit or respectively standardized protocols utilized in the bus line configuration HB or respectively data formats into domestic appliance-specific protocols or respectively data formats for the individual domestic appliances. Here therefore it is not the domestic appliances A1 . . . Am, An alone, but especially the bus couplers BCU1 . . . BCUm, BCUn which are responsible for data exchange and bus-typical network management.

The bus line configuration HB forming the above-mentioned first communications network or respectively belonging to it can, in the event where the domestic appliances A1 . . . Am, An are located for example in a house or in neighbouring houses, can be a so-called home bus, which forms the first communications network for all domestic appliances present in the relevant house or in the relevant houses.

At this point is should be noted that the first communications network (HB) can also be a wireline communications network, whereof the communications lines are formed by voltage supply lines of the individual domestic appliances fed by a mains voltage source. Therefore, in this case the communications between the bus couplers BCU1 . . . BCUm, BCUn and the transmission device GW run via voltage supply lines of the individual domestic appliances, which are connected with the relevant bus couplers BCU1 . . . BCUm, BCUn.

In addition, the first communications network (HB) can also be run as a radio network, in which the individual domestic appliances communicate by send and receive devices, which then fulfil the functions of the above-mentioned bus couplers BCU1, BCUm, BCUn.

The transmission devices GW1 to GWx, via which the relevant first communications network is connected with further communications networks NET1 to NETx, are connected to the bus line configuration HB forming the first communications network in the present embodiment according to FIG. 1. This further communications networks NET1 to NETx can preferably be a public communications network or respectively the Internet. External control and/or monitoring devices, which for example can be formed by personal computer PC1 to PCx, are connected to the relevant further communications networks NET1 to NETx, as shown in FIG. 1.

After the structure of the device or respectively configuration illustrated in FIG. 1 has been explained to the extent required for an understanding of the present invention, from now on some procedural sequences are observed in the individual domestic appliances A1 . . . Am, An.

If the domestic appliance A1 for example is a washing machine, currently operating, then the operation is executed by a washing program stored in the ROM read-only memory by the central unit CPU. Program status values occurring in the individual program steps or respectively required for the latter are stored in the RAM read-write memory and can if required be displayed in the assigned display device D. Insofar as for example washing program data on the achieved washing progress are needed by other domestic appliances, such as for example a clothes dryer, which is likewise connected to the bus line configuration HB belonging to the first communications network, the data or respectively communications signals required for this are transmitted to the first communications network from the domestic appliance A1 via its interface device IF1 and the bus coupler BCU1 connected to the latter. By way of the first communications network and the bus coupler in question, such as for example the bus coupler BCUm, the relevant data or respectively communications signals then reach the assigned clothes dryer, which may be formed for example by the domestic appliance Am. The domestic appliance Am or respectively the clothes dryer forming the domestic appliance can thus for example take preparatory measures for preliminary drying of the laundry still in the above-mentioned washing machine, such as pre-heating.

In addition to the above-mentioned communication between domestic appliances, which are connected to the first communications network or respectively the bus line configuration HB belonging to the latter, there are also however yet other communications, in which the individual domestic appliances A1 . . . Am, An are included. Such communication runs for example when an updated program is to uploaded to one of the relevant domestic appliances. Such an uploading procedure can be undertaken for example from one of the external control and/or monitoring devices PC1 to PCx illustrated in FIG. 1 via one of the further communications networks NET1 to NETx and one of the illustrated transmission devices GW1 to GWx to the first communications network and from this via the corresponding bus coupler of the domestic appliance in question to the latter.

Further communications with a domestic appliance of the domestic appliances A1 . . . Am, An in question can result for example in the case of remote diagnoses by the above-mentioned external control and/or monitoring devices PC1 to PCx or from remote monitoring of the relevant domestic appliance by one of these external control and/or monitoring devices PC1 to PCx.

The method according to the present invention will now be explained in greater detail in an embodiment with reference to the schematic illustration of the course of registration procedures contained in FIG. 2.

Figure 2:
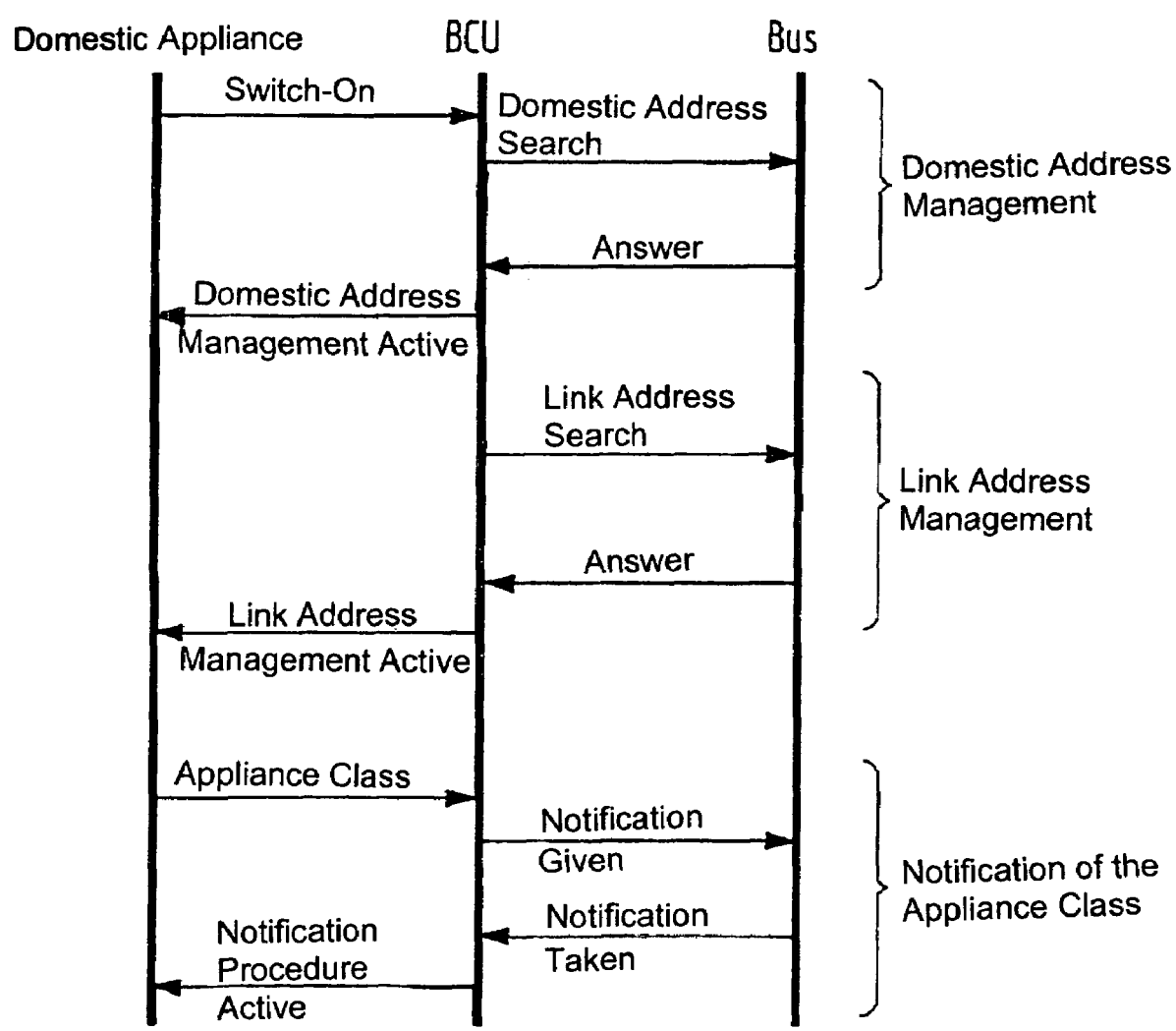
FIG. 2 is a schematic illustration showing a course of registration procedures in context with the domestic appliance illustrated in FIG. 1.

FIG. 2 illustrates three perpendicularly running bar lines, which symbolize domestic appliance (designated by domestic appliance), an assigned bus coupler (designated by BCU) and the bus line configuration (designated by bus). Arrow lines set in between the relevant bar lines in each case designate current procedures or emitted messages.

If one of the domestic appliances illustrated in FIG. 1, such as the domestic appliance A1, is connected with the bus line configuration HB via its assigned bus coupler BCU1, for example by the assigned voltage supply switch SW being actuated, registration of the connection of the relevant domestic appliance A1 runs in a virtual network containing the bus line configuration HB. The relevant registration procedure begins, as illustrated in FIG. 2, with a so-called domestic address management, and follows chaining or respectively link address management and a notification procedure. In all these procedures the course and/or state of registration of the connection of the relevant domestic appliance A1 is visualized on the bus line configuration HB according to the present invention by its display device D assigned to the relevant domestic appliance A1.

With domestic address management the relevant domestic appliance, such as domestic appliance A1, receives an unambiguous domestic address within the virtual network under the domestic appliances A1 . . . Am, An connected on the house bus HB. At the same time a domestic address search is undertaken by the assigned bus coupler BCU1 of the relevant domestic appliance A1; the bus coupler BCU1 generates addresses and sends these over the house bus HB. If such an address is already allocated to another domestic appliance, such as e.g. the domestic appliance Am, then it logs its assigned bus coupler, such as the bus coupler BCUm, as an "objection". Right then the bus coupler BCU1 of the first-mentioned domestic appliance A1 tries with at least another address, until there is finally a "positive" answer from the other bus couplers, which are connected to the house bus HB. This address is then allocated to the domestic appliance A1 within the relevant domestic appliance bond in the above-mentioned virtual network as a domestic address, and it remains allocated to the relevant domestic appliance A1 in this bond in the assigned bus coupler BCU1 in the future also, e.g. after the relevant domestic appliance A1 is switched off or after it is taken away from and then reconnected to the assigned bus coupler BCU1.

The above-mentioned domestic address management thus corresponds to an address search method, known in English as trial and error. This procedure lasts a certain time, e.g. 5 to 10 minutes. During this time in the display device D assigned to the domestic appliance A1 the state and/or course of the relevant registration procedure is visualized, for example via the display "domestic address management active".

Although the respective domestic appliance is provided with an unambiguous domestic address by the above-mentioned domestic address management, this cannot yet be accessed however via the bus line configuration, such as the domestic appliance A1, therefore the house bus HB. More information on it is required via which bus coupler the relevant domestic appliance is connected to the above-mentioned bus line configuration HB. Next the chaining or respectively link address management is applied, through which the bus coupler of a domestic appliances, with respect to which domestic address management has been carried out, receives an unambiguous link address within the virtual network containing the bus line configuration or respectively the house bus HB.

In principle, with this procedure a corresponding method runs, as has been explained for the domestic address management. First, one or more link address attempts run and only when a "positive" answer is received from the other bus couplers does the bus coupler, which executes the chaining or respectively link address management, have an address which can be used for it. The address thus determined is finally captured in the relevant bus coupler, such as the bus coupler BCU1 of the domestic appliance A1, which thus has the entire address available, by which the relevant domestic appliance, such as the domestic appliance A1, is clearly designated or respectively can be addressed in the house bus HB containing the bus line configuration or respectively the virtual network.

The above-mentioned chaining or respectively link address management likewise lasts a certain time, e.g. up to two minutes. During this time the state and/or course of the relevant registration procedure is visualized in the display device D assigned to the domestic appliance A1, for example by the display "link address management active".

With the finally completed notification procedure, also described as logging or respectively enrolling procedure (known in English as enrollment), a domestic appliance, such as the domestic appliance A1, connected to the bus line configuration HB with respect to which the above-mentioned methods, namely the domestic address management and the link address management have been carried out, announces its identification, that is, its appliance class over the bus line configuration HB. The announcing of the appliance class takes place simultaneously with the issuing of the address from the assigned bus coupler clearly designating the relevant domestic appliance, such as the bus coupler BCU1. An announcement on the relevant domestic appliance A1 is therefore given via the bus line configuration HB to the other bus couplers and if required to the transmission devices GW1 to GWx illustrated in FIG. 1. In this way for example other domestic appliances, which likewise are connected to the bus line configuration HB and which are interested in communication with the relevant domestic appliance A1 or which have to perform such communication, can accept the above-mentioned message on the above-mentioned domestic appliance A1 and correspondingly record it.

This notification procedure likewise requires a certain time, e.g. one minute.

During this time in the display device D assigned to the domestic appliance A1 the state and/or course of the relevant registration procedure is visualized, for example via the display "notification procedure active".

In addition to the visualizing of registration sequences or respectively states mentioned previously and as shown in FIG. 2, yet other states can be visualized by the display device of the respective domestic appliance, such as e.g. "Search for transmission device", "No transmission device present", "Logon to transmission device GWx", "Logoff of transmission device GW1", "No transmission device present, no communication possible externally".

Visualizing of the activity of the assigned bus coupler on the above-mentioned bus line configuration HB takes place by the display device of the respective domestic appliance.

As already mentioned hereinabove, the link address management and notification procedure is performed at every start-up of a domestic appliance or every time the relevant domestic appliance is reconnected to its assigned bus coupler. The reason for this is that after the relevant domestic appliance is taken out of service another corresponding domestic appliance could meanwhile be connected to the bus line configuration, with respect to which a corresponding link address management and a corresponding notification procedure are performed, and that the other domestic appliance if required receives the chaining or respectively link address, which the domestic appliance possessed, from now on out of operation.

Only the domestic address, allocated to a domestic appliance, needs to be given out at its initial startup, since the assigned bus coupler connected to the bus line configuration HB knows and retains this address and thus it is ensured that this address is not used again for another domestic appliance, connected to another bus coupler in turn connected with the relevant bus line configuration.

When a domestic appliance, such as the domestic appliance A1, is connected to the bus line configuration or respectively the house bus HB, the above-mentioned registration procedure must now occur not only in the above-mentioned manner, but the relevant registration procedure may also occur in any other manner. The relevant registration procedure can for example run using a central address issuing device connected to the bus line configuration or respectively to the house bus HB.

Independently of the registration procedure used in each case, which runs at initial or every start-up of a domestic appliance, such as the domestic appliance A1, however, the respective registration sequence and/or registration status is visualized in the display device assigned to the relevant domestic appliance. In this way the user or operator of the relevant domestic appliance can recognize that the domestic appliance is in the registration phase when being connected to the above-mentioned bus line configuration and is not disturbed or respectively is not working defectively.

We claim:

1. A method for detecting a registration of a connection of a domestic appliance on a bus line configuration, a plurality of domestic appliances for transmitting data to be connected or respectively are connected to the bus line configuration, which comprises the steps of:
    connecting the domestic appliance to the bus line configuration through an appliance interface of the domestic appliance, and through the bus line configuration transmitting data into the and/or from the domestic appliance;
    displaying operating modes and/or operating data of the domestic appliance on at least one display device of the domestic appliance;

during the registration of the connection of the domestic appliance to the bus line configuration, visualizing on the display device of the domestic appliance a course and/or state of the registration of the connection of the domestic appliance to the bus line configuration;

using course and/or status messages of a bus coupler connected with the domestic appliance for visualizing the course and/or state of the registration;

during the visualizing step, visualizing a domestic address management process on the display device, by which the domestic appliance is integrated into a virtual network containing the bus line configuration;

allocating the domestic appliance, in the virtual network, an unambiguous domestic appliance address;

visualizing a chaining or respectively link address management process on the display device, via which in the virtual network an unambiguous bus coupler address is allocated to the bus coupler connected with the domestic appliance, by which the bus coupler is clearly identifiable among the bus couplers connected with the domestic appliances; and visualizing through the display device, an execution of a notification procedure, through which an appliance class of the domestic appliance in the virtual network is made known, by which the domestic appliances present in the virtual network are determined, whether they want to or must communicate with the appliance.

2. The method according to claim 1, which further comprises undertaking the registration on start-up of the domestic appliance connected to the bus line configuration.

3. The method according to claim 1, which further comprises:
   performing the visualization step of the domestic address management process only at an initial startup of the domestic appliance; and
   performing the visualization steps of the link address management process and the notification procedure at every startup of the domestic appliance.

4. The method according to claim 1, which further comprises forming the bus line configuration as a wireline communications network containing communications lines, the communications lines being used by a mains voltage source feeding current supply lines of the domestic appliances.

5. The method according to claim 1, which further comprises forming and running the bus line configuration as a radio network, in which the domestic appliances communicate by send and receive devices forming bus couplers.

* * * * *